United States Patent
Felty

(10) Patent No.: US 9,894,742 B2
(45) Date of Patent: Feb. 13, 2018

(54) DIMMER WITH PHOTO SENSOR AND HIGH/LOW CLAMPING

(71) Applicant: GENERAL ELECTRIC COMPANY, Schenectady, NY (US)

(72) Inventor: Jeffrey Glenn Felty, Elyria, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/127,048

(22) PCT Filed: Feb. 3, 2015

(86) PCT No.: PCT/US2015/014186
§ 371 (c)(1),
(2) Date: Sep. 19, 2016

(87) PCT Pub. No.: WO2015/147988
PCT Pub. Date: Oct. 1, 2015

(65) Prior Publication Data
US 2017/0332465 A1    Nov. 16, 2017

Related U.S. Application Data

(63) Continuation of application No. 14/224,710, filed on Mar. 25, 2014, now abandoned.

(51) Int. Cl.
*H05B 31/48* (2006.01)
*H05B 33/08* (2006.01)
(Continued)

(52) U.S. Cl.
CPC ......... *H05B 41/38* (2013.01); *H05B 33/0851* (2013.01); *H05B 33/0854* (2013.01); *H05B 37/0218* (2013.01)

(58) Field of Classification Search
CPC ............... H05B 31/48; H05B 33/0851; H05B 33/0854; H05B 37/0218
(Continued)

(56) References Cited

U.S. PATENT DOCUMENTS 3,916,183 A    10/1975 Duve et al.
4,023,034 A    5/1977 Schacht
(Continued)

FOREIGN PATENT DOCUMENTS

EP    2403120 A2    1/2012
WO    2013186656 A1    12/2013

OTHER PUBLICATIONS

International Search Report and Written Opinion issued in connection with corresponding PCT Application No. PCT/US2015/014186 dated Jun. 29, 2015.

*Primary Examiner* — Dylan White
(74) *Attorney, Agent, or Firm* — Peter T. DiMauro; GE Global Patent Operation

(57) ABSTRACT

Provided is a circuit for controlling a level of brightness of a light electrically coupled to a dimming circuit including control leads configured to provide a dimming control voltage to the dimmable driver, the dimming control voltage having a permissible voltage range. The circuit includes a photo sensor for detecting an ambient light level in the vicinity of the light and a clamp controller for selectively reducing the dimming control voltage to a clamped voltage range less than the permissible voltage range. Also included is a feedback controller for adjusting the dimming control voltage in response to a detected ambient light level, the dimming control voltage being within the clamped voltage range.

9 Claims, 4 Drawing Sheets

(51) Int. Cl.
   *H05B 37/02* (2006.01)
   *H05B 41/38* (2006.01)
(58) Field of Classification Search
   USPC .......................................................... 315/291
   See application file for complete search history.

(56) References Cited

U.S. PATENT DOCUMENTS

| | | | |
|---|---|---|---|
| 4,155,122 A | 5/1979 | Budmiger | |
| 4,180,931 A | 1/1980 | Wi et al. | |
| 4,464,606 A | 8/1984 | Kane | |
| 4,546,419 A | 10/1985 | Johnson et al. | |
| 4,660,937 A | 4/1987 | Richardson et al. | |
| 4,697,122 A | 9/1987 | Hoffer et al. | |
| 4,727,290 A | 2/1988 | Smith et al. | |
| 4,864,278 A | 9/1989 | Wiley et al. | |
| 5,212,468 A | 5/1993 | Adell et al. | |
| 5,347,261 A | 9/1994 | Adell et al. | |
| 5,402,040 A | 3/1995 | Sprout | |
| 5,404,080 A | 4/1995 | Quazi et al. | |
| 5,581,158 A | 12/1996 | Quazi et al. | |
| 5,701,058 A | 12/1997 | Roth | |
| 5,742,131 A * | 4/1998 | Sprout | H05B 41/3922 315/149 |
| 5,789,869 A | 8/1998 | Lo et al. | |
| 6,114,813 A | 9/2000 | Lo et al. | |
| 6,583,573 B2 | 6/2003 | Bierman et al. | |
| 6,929,388 B2 | 8/2005 | Campbell et al. | |
| 7,145,295 B1 | 12/2006 | Lee | |
| 7,521,872 B2 | 4/2009 | Bruning et al. | |
| D602,388 S | 10/2009 | Killo | |
| 7,859,595 B2 | 12/2010 | Gutta et al. | |
| D631,770 S | 2/2011 | Killo | |
| 7,894,000 B2 | 2/2011 | Gutta et al. | |
| 7,932,953 B2 | 4/2011 | Gutta et al. | |
| 8,000,314 B2 | 8/2011 | Brownrigg et al. | |
| 8,013,732 B2 | 9/2011 | Petite et al. | |
| 8,031,650 B2 | 10/2011 | Petite et al. | |
| 8,049,301 B2 | 11/2011 | Hui | |
| 8,064,412 B2 | 11/2011 | Petite et al. | |
| 8,171,136 B2 | 5/2012 | Petite et al. | |
| 8,193,737 B2 | 6/2012 | Peker et al. | |
| 8,193,930 B2 | 6/2012 | Petite et al. | |
| 8,212,667 B2 | 7/2012 | Petite et al. | |
| 8,378,589 B2 * | 2/2013 | Kuo | H05B 33/0815 315/209 R |
| 2003/0039125 A1 | 2/2003 | Campbell et al. | |
| 2003/0090210 A1 | 5/2003 | Bierman et al. | |
| 2010/0176733 A1 | 7/2010 | King | |
| 2010/0289412 A1 | 11/2010 | Middleton-White et al. | |
| 2011/0062888 A1 | 3/2011 | Bondy | |
| 2012/0139426 A1 | 6/2012 | Ilyes et al. | |
| 2012/0256553 A1 * | 10/2012 | Chen | H05B 33/0845 315/205 |
| 2014/0002772 A1 | 1/2014 | Yang et al. | |
| 2014/0167652 A1 * | 6/2014 | King | F21V 23/02 315/307 |
| 2015/0086561 A1 * | 3/2015 | Kauvar | C12Q 1/18 424/139.1 |
| 2015/0282275 A1 * | 10/2015 | Felty | H05B 37/0218 315/152 |

\* cited by examiner

DIMMER WITH PHOTO SENSOR AND HIGH/LOW CLAMPING

CROSS-REFERENCE TO RELATED APPLICATIONS

This Application is a National Stage filing under 35 USC 371 of co-pending International Application PCT/US2015/014186, filed 3 Feb. 2015, pending, which in turn claims priority under 35 USC 120 and 35 USC 365 of U.S. patent application Ser. No. 14/224,710, filed 25 Mar. 2014, now abandoned.

FIELD OF THE INVENTION

The present invention relates generally to the field of light dimming control. More particularly, the present invention relates to controlling the dimming range of a light fixture coupled to a dimmer.

BACKGROUND OF THE INVENTION

The Illuminating Engineering Society of North America recommends a 30-50 foot-candle (fc) range for ambient (general) office lighting, yet most workspaces are lit to 60 fc on average. Over-lighting can cause unnecessary eye strain for occupants and higher energy costs for companies. Under-lighting can also cause unnecessary eye strain and provide a less pleasing or less productive workspace.

Further, in large or open workspaces, whether the spaces are commercial, industrial, retail, or public, such as office buildings, warehouses, schools, malls, and the like, the amount of light provided within the space is impacted not only by the artificial lighting system installed in the space but also by the amount of natural light entering the space through windows, doors, and skylights.

However, the amount of natural light entering a space can vary greatly based on the time of day, the time of year, and the weather conditions at any point in time. Further, the location and angle of the natural light entering the space can also vary greatly based on those same factors.

Many different types of lighting-control system have been developed to help reduce energy waste and take advantage of natural light conditions, while still providing a productive and pleasing visual environment. Lighting control means having the ability to illuminate a space where and when it is needed and the power to conserve energy when and where illumination is not needed. To accomplish this, controls can ideally provide the right amount of light where and when it is needed—either automatically or at a user's discretion.

Lighting controls, such as dimming features, can reduce lighting energy consumption and produce energy savings, especially if the dimming is responsive to the amount of natural light entering a space. Dimming a light fixture saves energy when operating a light source and also allows a user to adjust the intensity of the light source to a desired level. Many indoor and outdoor facilities, such as homes, buildings, parking lots, and streets, include light source dimming circuits.

The most common use of dimming is for indoor applications, such as for dimming a room. Dimming is also ideally suited to energy management applications, such as daylight harvesting. For example, automated dimming systems can provide a smooth and unnoticeable transition to lower electric light levels as daylight levels increase, all while maintaining the desired light level, to produce significant lighting energy savings.

For example, a time-based dimming controller can turn on a lighting fixture at dusk, dim the lighting fixture at one or more predetermined times to preset amounts, return the lighting fixture to full brightness at 5 a.m., and turn off the lighting fixture at dawn, offering 20-30 percent energy savings above normal photocell operation.

Photo sensors can also be used to good effect to dim light fixtures in a workspace based on detecting ambient light levels. However, as stated above, in larger workspaces and open areas, the amount of ambient light can vary significantly in different parts of the workspace, based on proximity or distance from natural light sources and based on amount of natural light coming into the workspace at different times of the day, at different times of the year, and based on variable weather conditions, which can change frequently throughout a single day.

However, merely adding more photo sensors to different banks of lights within such large workspace does not necessarily create a pleasing or uniform lighting environment. Nor does it address the end user's needs, which may be to have higher or lower lighting in selected areas of the workspace.

There is thus a need to enable an end user to limit the range and hence the dimming level of selected lighting fixtures or banks of lights within a workspace. This is important for users who want a more uniform "ceiling" appearance throughout the entire workspace or who want a generally uniform ceiling appearance, but need more customized lighting in selected areas of the workspace. An example would be an installation with multiple photocells installed. The fixtures near windows could be noticeably dimmer than fixtures further away. Thus, it may be desirable for the end user to be able to set customizable dimming or brightness levels to keep the light level between various fixtures closer in light level even as the ambient light level within the space varies.

These and many other needs are addressed by the circuits, methods, devices, and systems for controlling the brightness level of a light electrically coupled with a dimmable driver, such as a dimming ballast or LED driver, as described in greater detail hereinafter.

SUMMARY OF EMBODIMENTS OF THE INVENTION

Given the aforementioned deficiencies, a need exists for circuits, methods, devices, and systems for controlling the brightness level of a light electrically coupled with a dimmable driver, such as a dimming ballast or LED driver, includes a dimming controller that provides a dimming control voltage to the driver, the dimming control voltage having a permissible voltage range that is selectively reduced to a clamped dimming voltage that is less than and contained with the permissible voltage range.

In response to the detection of the actual ambient light level in the vicinity of the light being controlled, the dimming control voltage is adjusted to change the brightness level of the light to converge toward a desired ambient light level. Multiple drivers may be controlled by a single dimming controller having a photo sensor for detecting the actual ambient light level.

One embodiment of the present invention includes a circuit for controlling a level of brightness of a light electrically coupled to a dimming circuit including control leads configured to provide a dimming control voltage to the dimmable driver, the dimming control voltage having a permissible voltage range. The circuit includes a photo sensor for detecting an ambient light level in the vicinity of the light and a clamp controller for selectively reducing the dimming control voltage to a clamped voltage range less than the permissible voltage range. Also included is a feedback controller for adjusting the dimming control voltage in response to a detected ambient light level, the dimming control voltage being within the clamped voltage range In the embodiments, the clamped voltage range has a high voltage limit set lower than the maximum output voltage and a low voltage limit set higher than the minimum output voltage. The actual ambient light level detected by the photo sensor is compared to a desired ambient light level and the feedback controller adjusts the dimming control voltage to adjust the level of brightness of the light to cause the actual ambient light level to converge toward the desired ambient light level. The desired ambient light level is set using a reference voltage controller.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention.

DETAILED DESCRIPTION OF EMBODIMENTS OF THE INVENTION

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
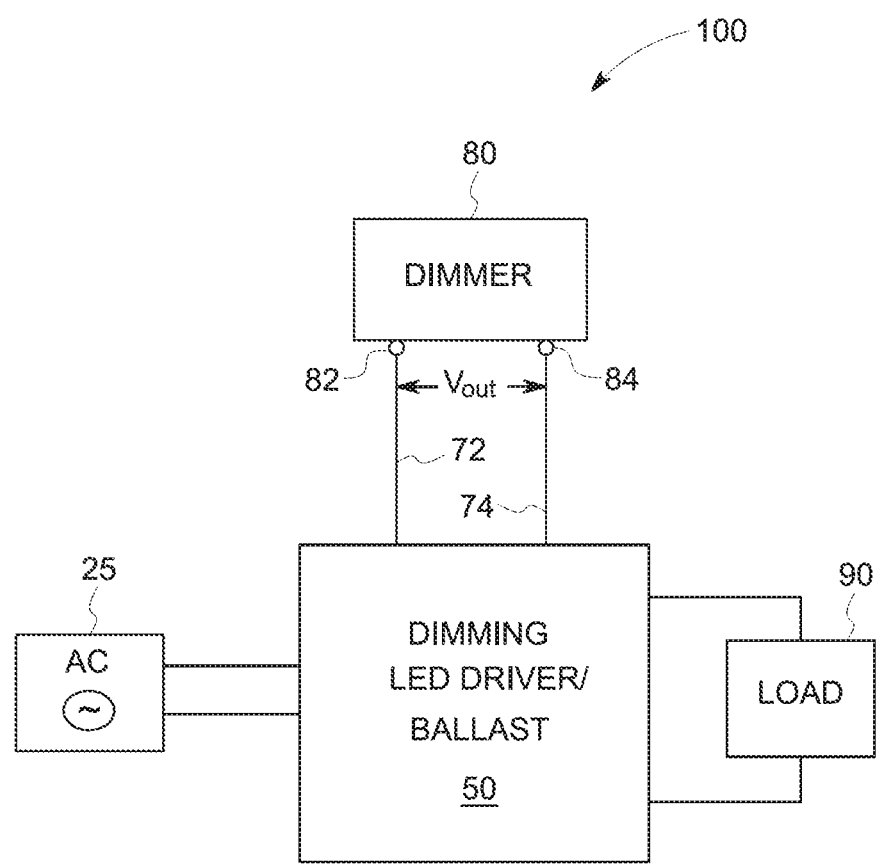
FIG. 1 shows a simplified block diagram of one example embodiment of a lighting system having a 0-10V dimmer control.

FIG. 1 is an exemplary block diagram showing the primary components of a lighting system 100 having dimming control. The lighting system 100 includes a dimmable driver 50 connected between an AC power supply 25 and an illumination load or light 90. As used herein, and depending upon the specific lighting application, the dimmable driver 50 is preferably either a dimming light emitting diode (LED) driver or a dimming ballast.

As will be appreciated by those of skill in the art, the dimming LED driver is conventionally used to drive an illumination load 90, such as one or more LEDs or an LED array, and the dimming ballast is conventionally used to drive a different type of illumination load 90, such as a fluorescent light. The dimmable driver 50 preferably includes low voltage control wires or leads 72, 74 (conventionally colored violet and gray, respectively) that provide a low direct current (DC) voltage (e.g, 0-10V) to a dimmer control circuit 80.

As will be explained hereinafter, the voltage ($V_{OUT}$) measured across the violet and gray low DC voltage leads or connectors 82, 84 of the dimmer control circuit 80 is used by the dimmable driver 50 to modify the power (typically the current, but sometimes the output voltage) provided by the dimmable driver 50 to the illumination load 90; thus, enabling the brightness level of light emitted from the illumination load 90 to be controllably dimmed between a non-dimmed, maximum (100%) output level and a predetermined, lower, minimum output level—preferably at a level that still emits some light and is not completely turned off.

As is conventional, the AC voltage and current from the AC power supply 25 typically runs first through a bridge or full-wave rectifier (not shown) and a high frequency input filter (not shown), which filters out high frequency noise and/or electromagnetic interference and prevents such noise or interference from being injected back into the bridge rectifier.

The dimmable driver 50 receives the rectified and filtered power from the AC power supply 25 and ensures that the power (either current or voltage) provided to the illumination load 90 does not exceed the current or voltage limits associated with the illumination load 90. The dimmer control circuit 80 provides a dimmer or dimming control voltage, conventionally ranging between 0 and 10V, sensed by the dimmable driver 50, which enables the light emitted from the illumination load 90 to be dimmed in a controllable manner by the driver 50 between full (100%) illumination (i.e., no dimming) and a minimum, lower illumination level (usually some percentage of dimming above 0%; otherwise, the light is turned off completely).

Generally, for performance and energy savings reasons, it is preferable to use an on/off switch to eliminate the light output of illumination load 90 completely, rather than to allow the dimmer control circuit 80 to cause the light output from the illumination load 90 to drop below its minimum, lowest illumination level to a zero output.

As will be described in greater detail hereinafter, the present dimmer control circuit 80 illustrates a type of photocell 0-10V dimmer that is powered from the conventional 0-10V output leads 72, 74 of the dimmable driver 50 (which, as used herein, is either a dimming ballast or a dimming LED driver). Since the dimmer control circuit 80 is powered from the 0-10V leads from the dimmable driver 50, a separate low voltage supply (and associated wiring) does not need to be provided.

The dimmer control circuit 80 uses a photo sensor component to measure ambient light, which includes a combination of both natural and artificial light sources detectable by the photo sensor component. Preferably, the photo sensor is placed at or near the light or illumination load 90 being controlled by its dimmable driver 50. This ambient light measurement is continuously or periodically compared to a desired or pre-determined light level or set point and, based on such comparison, the dimmer control circuit 80 varies the 0-10V voltage ($V_{OUT}$) of the dimmable driver 50 to maintain the output of the illumination load 90 at a desired light level brightness regardless of fluctuations in the natural or ambient light.

For example, as the amount of natural light increases (as detected by the photo sensor component), the dimmable driver 50 will cause the light output of the load 90 to dim, which in turn saves energy. Conversely, as the amount of natural light in a space decreases, the amount of dimming decreases, eventually to a point at which there is no dimming and the illumination load 90 is at its full-rated brightness level.

As will be described in greater detail hereinafter, the dimmer control circuit 80 preferably includes a selectable "ideal" or "reference" lighting level that the tenant, building manager, technician, automated system controller, or other end user can set as the brightness of light (combined natural and artificial) that the end user would like to maintain regardless of fluctuations in the ambient or natural light detected by the photo sensor.

As will also be described in greater detail hereinafter, the dimmer control circuit 80 preferably includes two optional clamp or clamping circuits. These clamp circuits work independently of each other, but can be used advantageously to limit the 0-10V dimming range, at either or both of the low and high ends, provided to the dimmable driver 50 by the dimmer control circuit 80. The clamp circuits enable the end user, to limit the output voltage ($V_{OUT}$) range across the violet and gray leads and, hence, limit the high and/or low dimming levels of the dimmable driver 50.

This dimming control for individual lights or groups of lights is important, typically for business and commercial lighting applications in which there is a need or desire to provide a more uniform "ceiling" appearance or illuminated space, particularly in a larger building or other interior space in which some lights are closer to windows (or other natural light sources, such as skylights, etc.) than others, which impacts the light distribution and setting within the space. An example would be a lighting installation with multiple photocells or photo sensors installed at different points within the space being illuminated by a plurality of light fixtures.

By way of example, fixtures near windows could be configured to be noticeably dimmer than fixtures further away—particularly during daylight hours when the amount of natural light entering the space is likely to be greater. The clamp circuits can be used to limit the low and high dimming levels to keep the light level between the fixtures closer in light level, while still taking into account the amount of ambient or natural light entering the space at any given point or time of day.

In addition, use of window shades or blinds in some windows could drastically affect the amount of ambient or natural light in different locations within a single building space. Since the clamping circuits are independent, multiple SKU products can be offered.

For example, there can be one SKU for a dimmer control (or dimmer control built into the ballast/LED driver) having no clamps, another SKU can be offered that only provides low clamping capability, another SKU can be offered that only provides high clamping capability, or, finally, another SKU can be offered that has both high and low clamping capability.

Figure 2:
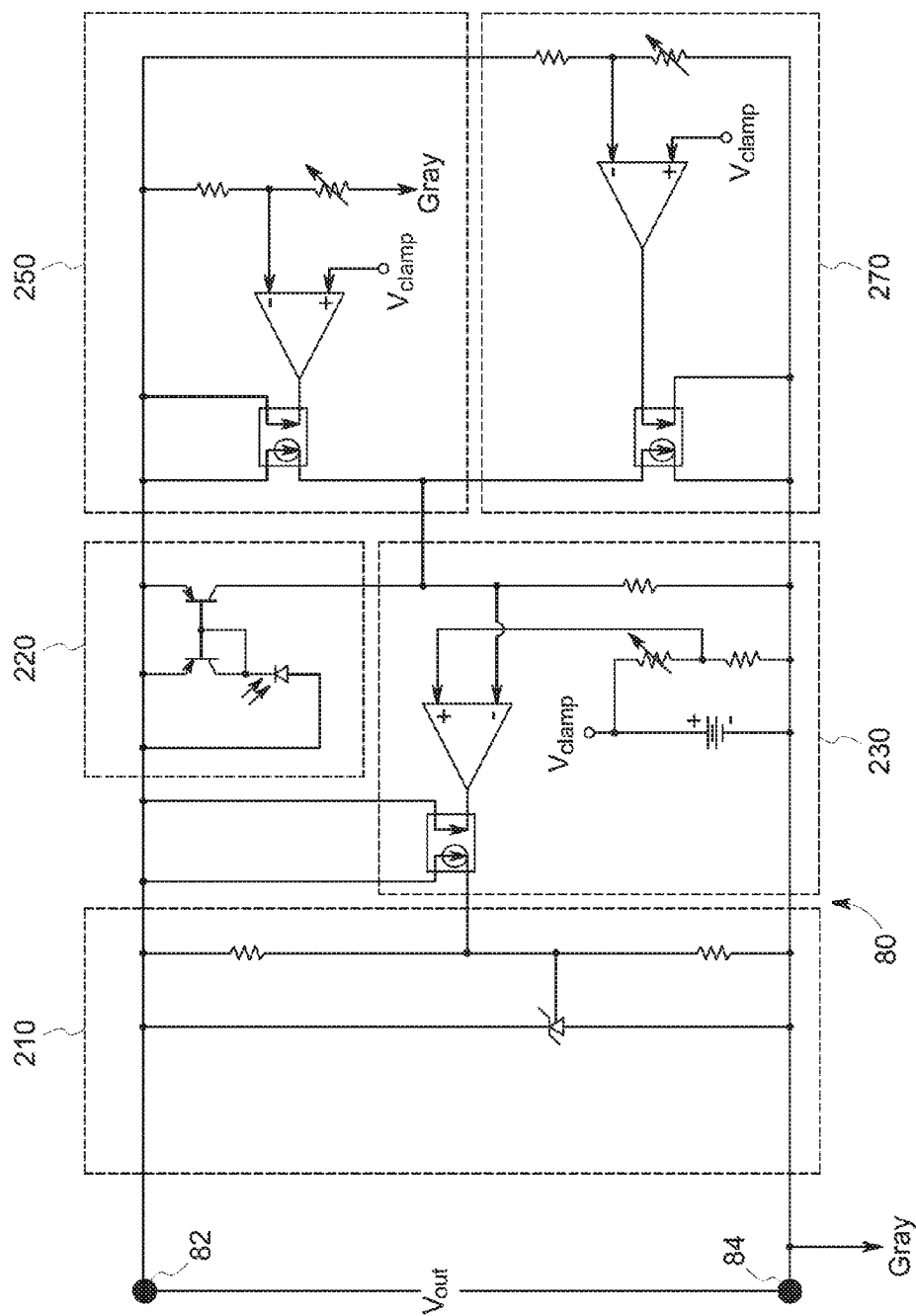
FIG. 2 shows a block diagram of the main components of an example embodiment of a dimmer control circuit usable with the lighting system illustrated in FIG. 1.

FIG. 2 shows a block diagram of the dimmer control circuit 80 of the example simplified system of FIG. 1 in more detail. The dimmer control circuit 80 is comprised of the violet and gray low DC voltage connectors 82, 84, respectively, which defines the output voltage ($V_{OUT}$) of the dimmer control circuit 80 and which is designed to be connected to the low DC voltage leads 72, 74 from the dimmable driver 50 (as shown in FIG. 1). The dimmer control circuit 80 preferably includes a shunt regulator circuit 210, an ambient light photo sensor and feedback circuit 220, an error signal circuit 230, an optional upper clamp circuit 250, and an optional lower clamp circuit 270.

In practice, the dimmable driver 50 provides a predetermined or known input current to the dimmer control circuit 80 at the violet low DC voltage connector 82. The dimmer control circuit 80 then adjusted its relative resistance value, based on the amount of light detected by the photo sensor and feedback circuit 220, to provide the desired output voltage ($V_{OUT}$) across the violet and gray low DC voltage connectors 82, 84, which determines the amount of current provided to the illumination load 90, which, in turn, impacts the amount of dimming, if any, of the light output from the illumination load 90.

The optional upper and lower clamp circuits 250 and 270, respectively, determine whether the default minimum and maximum output voltages ($V_{OUT}$) (or, stated another way, the default "range" of output voltages) that can be output by the dimmer control circuit 80 are artificially capped, limited, or clamped to a minimum threshold output voltage greater than the default minimum output voltage and/or to a maximum threshold output voltage less than the default maximum output voltage.

As will be appreciated by one of skill in the art, it is possible for a plurality of drivers 50 to be connected simultaneously to the dimmer control circuit 80. In such a design configuration, the input currents provided to the dimmer control circuit 80 at the violet low DC voltage connector 82 by all of the plurality of drivers 50 are added together to provide a single predetermined or known input current.

The number of drivers 50 simultaneously connected to a single dimmer control circuit 80 will necessarily be limited by the maximum current input parameters permitted by the specific components, as will described with reference to FIG. 3, connected to the violet low DC voltage connector 82.

However, for practical reasons, the number of drivers 50 connected to a single dimmer control circuit 80 will also be limited from a practical standpoint based on the physical placement of one or more ambient light photo sensor and feedback circuits 220 within a space to be lighted and based on how sensitive one wants to be in controlling the dimming levels of lights or groups of lights within a space.

Use of many ambient light photo sensor and feedback circuits 220, each connected to one or a small number of light fixtures, allows for much finer control over the lighting levels within a space. Conversely, using fewer ambient light photo sensor and feedback circuits 220, each connected to a larger number of light fixtures, would provide much less control over the lighting levels within different areas of the same space.

Figure 3:
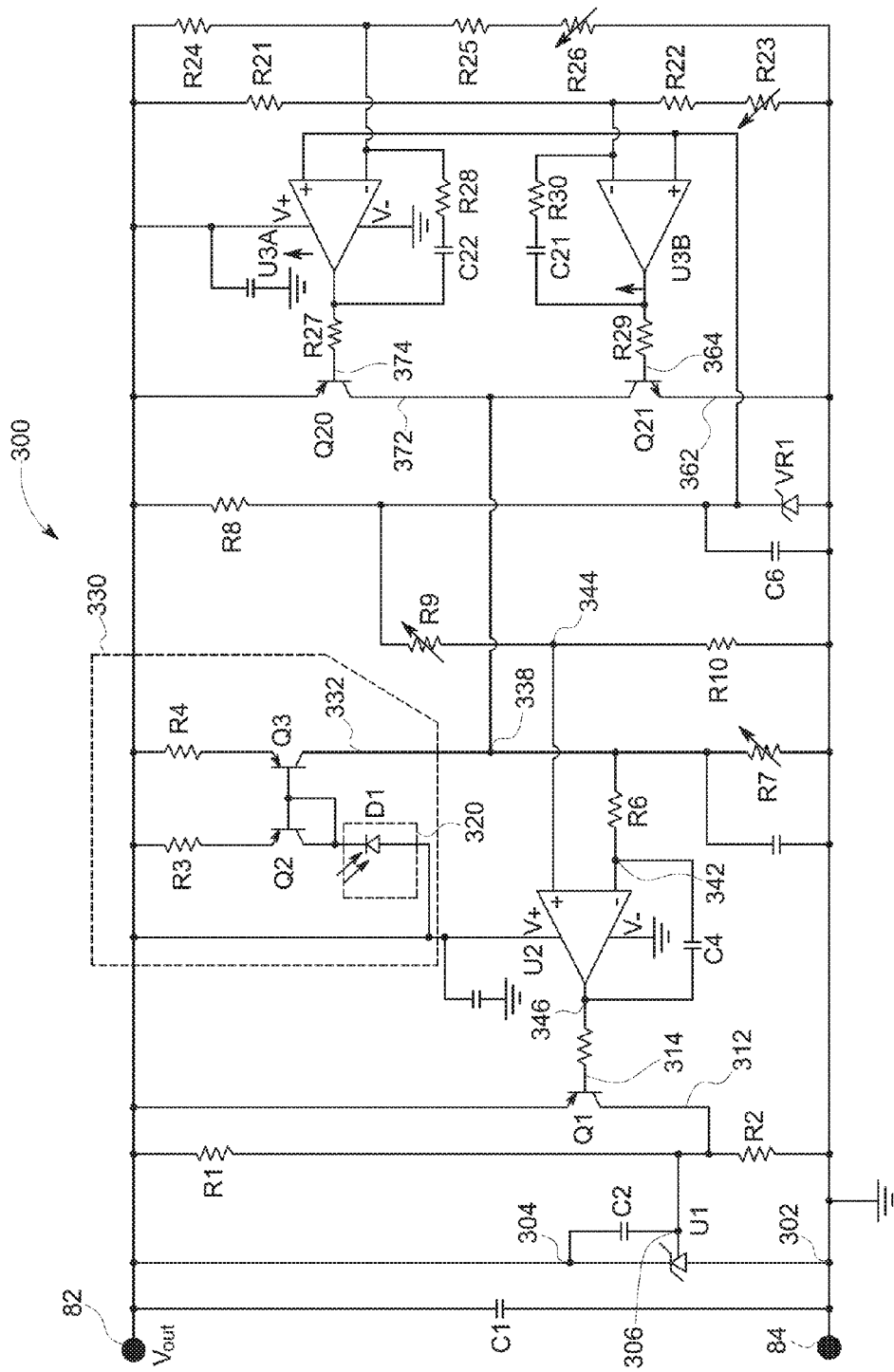
FIG. 3 shows a schematic diagram of the main components of the dimmer control circuit of FIG. 2.

Turning now to FIG. 3, a detailed schematic 300 of a preferred embodiment of the circuitry design of the dimmer control circuit 80 and each of its macro components, as described above with reference to FIG. 2, is illustrated and discussed in greater detail. As stated previously, the dimming leads 72, 74 of the dimmable driver 50 (dimming ballast or dimming LED driver) are labeled "violet" and "gray" and connect, respectively, with the violet and gray low DC voltage connectors 82, 84 of the dimmer control circuit 80.

A primary component of dimmer control circuit 80 and, specifically of the shunt regulator circuit 210, is the shunt regulator U1. In a preferred embodiment, the shunt regulator U1 is a TLV431 semiconductor device, which is an exemplary low voltage, precision, adjustable shunt regulator, manufactured and available from numerous vendors worldwide, including Semiconductor Components Industries, LLC based in Phoenix, Ariz., USA and having a website at http://www.onsemi.com and Texas Instruments Incorporated based in Dallas, Tex., USA and having a website at http://www.ti.com.

The shunt regulator U1, along with its complementary components that make up the shunt regulator circuit 210, serves three primary functions, including: (1) providing a maximum dimming voltage ($V_{OUT}$), (2) providing reverse polarity protection for the dimmer control circuit 80, and (3) providing a sink for the current from the dimming leads 72, 74. The shunt regulator U1 has three leads or pins: an anode 302, a cathode 304, and a reference 306. The low voltage shunt regulator U1 has a built-in diode, which protects the internal circuitry within the shunt regulator U1, from the effects of an accidental mis-wiring at the three leads or pins.

The shunt regulator U1 "outputs" a voltage ($V_{OUT}$), as detected at cathode 304 and as detected at the violet low voltage input 82 of the dimmer control circuit 80. The maximum output voltage ($V_{OUT}$) is controlled by the internal reference voltage ($V_{REF}$) of the shunt regulator U1 and the resistance values of resistors R1 and R2. Low voltage shunt regulators typically have a reference voltage of approximately 1.25V or 2.5V. Preferably, and as used herein, the shunt regulator U1 has a reference voltage of approximately 1.25V to provide a low voltage output close to, but slightly above, 0V. The ideal equation (Equation1) for determining the maximum output voltage ($V_{OUT}$) for the low voltage shunt regulator U1 is defined by:

$$V_{OUT}=V_{REF}*(1+R1/R2)$$

Thus, with a known voltage reference ($V_{REF}$) and a desired maximum output voltage ($V_{OUT}$), the values of resistors R1 and R2 can be chosen to set the desired maximum output voltage ($V_{OUT}$) that can be provided by the dimming control circuit 80 back to the dimmable driver 50. In a preferred embodiment, the values of R1 and R2 are chosen so that the maximum output voltage ($V_{OUT}$) generated by the above Equation1 is approximately 10V.

The minimum output voltage ($V_{OUT}$) will be approximately the same as the voltage reference ($V_{REF}$), which in this case is 1.25V, for reasons that will be now explained. Specifically, although it is possible to modify the output voltage dynamically by varying the resistance values of R1 and/or R2, the preferred system described herein keeps resistors R1 and R2 at their predetermined, fixed resistance values and, instead, modifies the injection current ($I_{INJ}$) feeding into the node between resistors R1 and R2, which represents the variable current flowing from the collector 312 of transistor Q1 into the reference pin 306 of the shunt regulator U1. The ideal equation (Equation2) for determining the "actual" output voltage ($V_{OUT}$) for the low voltage shunt regulator U1 based on the variable injection current ($I_{INJ}$) is defined by:

$$V_{OUT}=V_{REF}*(1+R1/R2)-*R1)$$

Thus, as can be readily determined, if the injection current ($I_{INJ}$) is zero, the output voltage ($V_{OUT}$) from the shunt regulator U1 is at its maximum value, having the same value as determined from Equation1. However, as the injected current ($I_{INJ}$) increases, the output voltage ($V_{OUT}$) of the shunt regulator U1 decreases down toward its minimum value, as set by the reference voltage ($V_{REF}$).

With reference back to the ambient light photo sensor and feedback circuit 220 from FIG. 2, such ambient light photo sensor and feedback circuit 220 includes a light sensitive device or photo sensor 320, such as the silicon photodiode D1 available under the semiconductor component name BPW21R, which is manufactured and available from numerous vendors, including Vishay Intertechnology, Inc. based in Malvern, Pa., USA and having a website at http://www.vishay.com.

Figure 4:
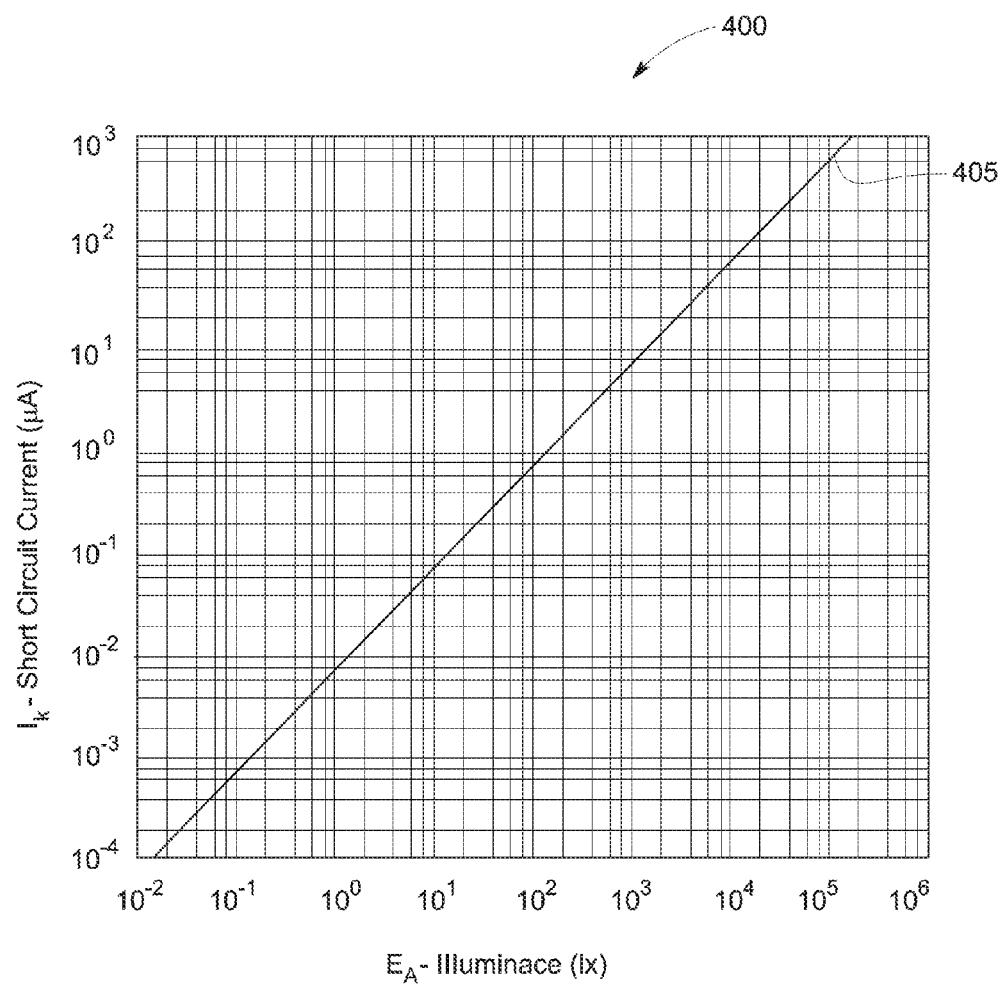
FIG. 4 shows a graph of the short circuit current generated in response to the level of ambient light detected by an exemplary photodiode, which is usable as a component of the dimmer control circuit of FIG. 3.

This photodiode D1 outputs a current ($I_K$) that is substantially linearly-correlated to the ambient and natural light levels ($E_A$) detected by the integrated photo sensor of the photodiode D1, as shown by the line 405 on graph 400 in FIG. 4. Thus, the current ($I_K$) generated by the photodiode D1 increases as the ambient and natural light detected by the photodiode D1 increases.

This current ($I_K$) is used by a current mirror 330 to provide both the short circuit and injection current ($I_{INJ}$) required by the dimmer control circuit 80. The current mirror 330 includes resistors R3 and R4, transistors Q2 and Q3, and the above-described photodiode D1. The current ($I_K$) generated by photodiode D1 causes a current to flow in transistor Q2, which, based on the configuration of the current mirror 330, causes a corresponding mirror current to flow in the collector 332 of transistor Q3.

The current flowing from the collector 332 of transistor Q3 represents a feedback current, which varies based on the amount of light detected by photodiode D1, as explained above. This feedback current flows through calibration resistor R7, which establishes a feedback voltage that is detected at the input into the negative (−) or inverting terminal 342 of operational amplifier (op amp) U2. Preferably, calibration resistor R7 is a variable resistor that will typically be calibrated at the factory, and not by an end user of the dimmer control circuit 80, to account for any slight variations or errors in the light sensor of the photodiode D1.

A reference voltage is provided to the positive (+) or non-inverting terminal 344 of operational amplifier (op amp) U2. This reference voltage correlates to and establishes the "ideal" or "reference" lighting level desired by the end user and that the end user would like to maintain regardless of fluctuations in the ambient or natural light detected by the photodiode D1. This reference voltage at terminal 344 is controlled by a reference voltage circuit, which includes resistors R8, R9, R10, shunt voltage regulator VR1, and capacitor C6. Resistor R9 is a variable resistor that enables the user to adjust the reference voltage provided to the non-inverting terminal 344 of op amp U2.

The voltage drop across resistor R9 is variable, but falls within a predefined range based on the resistance range of variable resistor R9 and the selected resistance value of resistor R10—wherein resistor R9 and resistor R10 together create a conventional voltage divider. Resistor R8 is used as a bias resistor to prevent too much current from overloading op amp U2 and shunt voltage regulator VR1. Shunt voltage regulator VR1 regulates the voltage range across resistors R8 and R9. Preferably, the reference voltage for shunt voltage regulator VR1 needs to be at (or lower than) the reference voltage of shunt regular U1. Thus, in this preferred embodiment, the reference voltage of VR1 is set to 1.25V (or less), since the reference voltage of shunt regulator U1 is set at 1.25V.

Thus, op amp U2 detects and compares the two input voltages: (i) the feedback voltage provided to the negative (−) or inverting terminal 342 (which fluctuates based on the amount of light detected by the photo sensor) and the reference voltage provided to the positive (+) or non-inverting terminal 344 (which represents the user-desired lighting level). In operation, the reference voltage provided to the positive (+) or non-inverting terminal 344 generally remains constant. The feedback voltage provided to the negative (−) or inverting terminal 342, however, will vary as the ambient light varies. Feedback components, including resistor R6 and capacitor C4, are adjusted and used for stability purposes.

Therefore, in operation, if the photodiode D1 detects very little to no ambient light, the feedback current flowing from the collector 332 of transistor Q3 is zero or otherwise very small, which causes the feedback voltage at the inverting terminal 342 to be lower than the reference voltage at the non-inverting terminal 344, which causes the output 346 of op amp U2 to go high, which drives the base 314 of transistor Q1, which, in turn, causes the injection current ($I_{INJ}$) from the collector 312 of transistor Q1 flowing into the node between resistors R1 and R2 to reduce toward zero, which causes the output voltage ($V_{OUT}$) from the shunt regulator U1 is go toward its maximum value, as determined from Equation1 and Equation2, which increases the light output of the illumination load 90.

On the other hand, as the photodiode D1 detects more and more ambient light, the feedback current flowing from the collector 332 of transistor Q3 increases, which causes the feedback voltage at the inverting terminal 342 gradually to increase. When the feedback voltage exceeds the reference voltage detected at the non-inverting terminal 344, the output 346 of op amp U2 goes low.

The amp U2 going low drives the base 314 of transistor Q1 and causes the injection current ($I_{INJ}$) from the collector 312 of transistor Q1 flowing into the node between resistors R1 and R2 to increase. This increase causes the output voltage ($V_{OUT}$) from the shunt regulator U1 is go toward its minimum value, as determined from Equation1 and Equation2.

Consequently, the dimmable driver 50 to begins dimming the light output from the illumination load 90, which makes sense based on the fact that ambient light is being detected and the light output from the illumination load 90 can be decreased to save energy and to maintain the light levels in the illuminated space at a more uniform level even as the amount of ambient light increases.

The upper and lower clamping circuits 250 and 270 can be used to modify the level of injection current ($I_{INJ}$) flowing into the shunt regulator U1. This artificially caps the maximum output voltage ($V_{OUT}$) provided by the dimmer control circuit 80 to the dimmable driver 50 to below 10V. Consequently, the illumination load 90 begins to Dan even if there is no or very little detectable ambient light.

Modification of the level of injection current ($I_{INJ}$) flowing into the shunt regulator U1 also artificially raises the minimum output voltage ($V_{OUT}$) provided by the dimmer control circuit 80 to the dimmable driver 50 to above its minimum reference voltage of 1.25V, which reduces the dimming of the illumination load 90 even when there is a higher level of detectable ambient light.

As described above, the feedback current flowing from the collector 332 of transistor Q3 and through calibration resistor R7 is used to calculate a feedback voltage corresponding to the amount of ambient light being detected, which can then be compared by op amp U2 with a reference voltage that is established, based on the desired light level selected by the end user, by varying the resistance of resistor R9. A clamping current can be used to modify the feedback current, having either a subtractive or additive effect on the feedback current at node 338, if the dimmer control circuit 80 includes either (or both) of the optional upper and lower clamp circuits 250 and 270, as will be described in greater detail hereinafter.

In addition to regulating the voltage range across resistors R8 and R9, shunt voltage regulator VR1 provides a reference voltage and is connected to the positive (+) or non-inverting terminals of op amps U3A and U3B. As stated previously, the reference voltage for shunt voltage regulator VR1 needs to be at (or lower than) the reference voltage of shunt regulator U1. Thus, in this preferred embodiment, the reference voltage of VR1 is set to 1.25V (or less), since the reference voltage of shunt regulator U1 is set at 1.25V.

The low clamp circuit 270 includes op amp U3B, resistors R21, R22, R23, R29, and R30, capacitor C21, and transistor Q21. Resistor R23 is adjustable by the end user to establish a low voltage set point. The low voltage set point can range from a low of 1.25V (i.e., the reference voltage of shunt regulator U1) to an arbitrary high of $X_H$ volts, for reasons that will become apparent. Thus, as the voltage output ($V_{OUT}$) of the dimmer control circuit 80 lowers toward the low voltage set point, the output of op amp U3B will increase and the base current 364 of transistor Q21 will increase. This will cause the collector current 362 of Q21 to increase and "steal" or siphon off some of the feedback current flowing from the collector 332 of transistor Q3.

As stated above, this has a subtractive effect on the feedback current at node 338. This causes the output voltage ($V_{OUT}$) to rise and stay above the low voltage set point. The output of op amp U3B will vary to keep the light level at the desired low set point.

The high clamp circuit 250 includes op amp U3A, resistors R24, R25, R26, R27, and R28, capacitor C22, and transistor Q20. Resistor R26 is adjustable by the end user to establish a high voltage set point. The high voltage set point can range from a high of 10V (i.e., the maximum output voltage of shunt regulator U1) to an arbitrary low of $X_L$ volts, for reasons that will become apparent. Thus, as the voltage output ($V_{OUT}$) of the dimmer control circuit 80 rises toward the high voltage set point, the output of op amp U3A will decrease and the base current 374 of transistor Q20 will increase. This will cause the collector current 372 of Q20 to increase and "inject" or feed more current into the feedback current flowing from the collector 332 of transistor Q3. As stated above, this has an additive effect on the feedback current at node 338. This causes the output voltage ($V_{OUT}$) to decrease and stay below the high voltage set point. The output of op amp U3A will vary to keep the light level at the desired high set point.

Because both transistors Q20 and Q21 connect into the feedback current flowing from the collector 332 of transistor Q3 at node 338, it will be apparent to one of skill in the art that it is not desirable to have both transistors Q20 and Q21 feeding or drawing current at node 338 at the same time. To avoid this conflict, if the dimmer control circuit 80 makes use of both the high and low clamp circuits 250, 270, it is necessary that the arbitrary high voltage $X_H$ set by the low clamp circuit 270 be lower than the arbitrary low voltage $X_L$ set by the high clamp circuit 250.

Even though the voltage levels for the arbitrary high and low voltages $X_H$ and $X_L$ could be close to each other, doing so would not make much practical sense because that would effectively limit the dimming range of the dimmer control circuit 80. Conversely, if the dimmer control circuit 80 has either the high or low clamp circuit 250, 270, but not both, then there is no worry about having an overlap between the arbitrary high and low voltages $X_H$ and $X_L$. However, it will also be appreciated by those of skill in the art that, in order for the either the high or low clamp circuits 250, 270 to have any impact, their set point voltages will still have to be set to a level somewhere between the minimum and maximum output voltages of the shunt regulator U1, which, in this case, is between 1.25V and 10V.

Embodiments of the present invention include a circuit for controlling a level of brightness of a light electrically coupled to a dimming circuit including control leads configured to provide a dimming control voltage to the dimmable driver, the dimming control voltage having a permissible voltage range. The circuit includes a photo sensor for detecting an ambient light level in the vicinity of the light and a clamp controller for selectively reducing the dimming control voltage to a clamped voltage range less than the permissible voltage range. Also included is a feedback controller for adjusting the dimming control voltage in response to a detected ambient light level, the dimming control voltage being within the clamped voltage range.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For example, various aspects of the present invention can be implemented by software, firmware, hardware (or hardware represented by software such, as for example, Verilog or hardware description language instructions), or a combination thereof. After reading this description, it will become apparent to a person skilled in the relevant art how to implement the invention using other computer systems and/or computer architectures.

It is to be appreciated that the Detailed Description section, and not the Summary and Abstract sections, is intended to be used to interpret the claims. The Summary and Abstract sections may set forth one or more, but not all, exemplary embodiments of the present invention as contemplated by the inventor(s), and thus, are not intended to limit the present invention and the appended claims in any way.

What is claimed is:

1. A circuit for controlling a level of brightness of a light electrically coupled to a dimming circuit including control leads configured to provide a dimming control voltage to a dimmable driver, the dimming control voltage having a permissible voltage range, the circuit comprising:
    a photo sensor for detecting an ambient light level in the vicinity of the light;
    a clamp controller for selectively reducing the dimming control voltage to a clamped voltage range less than the permissible voltage range; and
    a feedback controller for adjusting the dimming control voltage in response to a detected ambient light level, the dimming control voltage being within the clamped voltage range;
    wherein the detected ambient light level is compared to a desired ambient light level, the feedback controller adjusting the dimming control voltage to adjust the level of brightness of the light to cause and actual ambient light level to converge toward the desired ambient light level; and
    wherein the desired ambient light level is set via a reference voltage signal.

2. A method for controlling the dimming level of lights in an interior space, comprising:
    selectively reducing a voltage range of a dimming control voltage to a clamped voltage range that is less than a permissible voltage range;
    receiving an input current from one or more dimmable drivers, each of the one or more dimmable drivers electrically coupled to a respective light;
    detecting an actual ambient light level in the vicinity of the lights;
    comparing the detected actual ambient light level with a desired ambient light level;
    setting the dimming control voltage in response to the comparison of the detected actual ambient light level with the desired ambient light level, wherein the dimming control voltage must be within the selectively reduced clamped voltage range; and
    providing the dimming control voltage to the one or more dimmable drivers, the dimming control voltage determining the dimming level of the lights;
    wherein even with the maximum dimming of the lights, some light is still emitted from the lights; and
    wherein the clamped voltage range has a high voltage limit set lower than the maximum output voltage and wherein the dimming control voltage is capped at the high voltage limit.

3. A method for controlling the dimming level of lights in an interior space, comprising:
    selectively reducing a voltage range of a dimming control voltage to a clamped voltage range that is less than a permissible voltage range;
    receiving an input current from one or more dimmable drivers, each of the one or more dimmable drivers electrically coupled to a respective light;
    detecting an actual ambient light level in the vicinity of the lights;
    comparing the detected actual ambient light level with a desired ambient light level;
    setting the dimming control voltage in response to the comparison of the detected actual ambient light level with the desired ambient light level, wherein the dimming control voltage must be within the selectively reduced clamped voltage range;
    providing the dimming control voltage to the one or more dimmable drivers, the dimming control voltage determining the dimming level of the lights; and
    decreasing the dimming control voltage if the detected actual ambient light level is greater than the desired ambient light level;
    wherein the clamped voltage range has a low voltage limit set higher than the minimum output voltage and wherein the dimming control voltage is capped at the low voltage limit.

4. A circuit for controlling a level of brightness of a light comprising:
    a comparing circuit for comparing a signal representative of a detected light level with a reference signal responsive to (i) a desired light level and (ii) the level of brightness of the light; and a regulator circuit having a first node formed between series connected resistors and a second node for outputting a dimming voltage having a maximum and a minimum level;

wherein the maximum level is a function of a reference voltage and respective fixed values of the series connected resistors, the reference voltage being responsive to the desired light level; and wherein the minimum level is controlled only by varying a current injected into the first node.

5. The circuit of claim 4, further comprising a photo sensor for detecting an ambient light level and producing the detected light level signal.

6. The circuit of claim 4, further comprising an anode, wherein the first node is a cathode, and wherein the second node is a reference node.

7. The circuit of claim 6, wherein the regulator circuit includes a shunt regulator.

8. The circuit of claim 4, wherein the maximum level is defined by:

$$V\text{out(max)}=V\text{ref}*(1+R1/R2).$$

9. The circuit of claim 4, wherein the minimum level is defined by:

$$V\text{out(min)}=V\text{ref}*(1+R1/R2)-(I\text{inj}*R1).$$

* * * * *